United States Patent
Randall et al.

(10) Patent No.: US 11,221,631 B2
(45) Date of Patent: *Jan. 11, 2022

(54) PERFORMANCE ARENA FOR ROBOTS WITH POSITION LOCATION SYSTEM

(71) Applicant: Innovation First, Inc., Greenville, TX (US)

(72) Inventors: Mitch Randall, Longmont, CO (US); Robert H. Mimlitch, III, Greenville, TX (US)

(73) Assignee: Innovation First, Inc., Greenville, TX (US)

( * ) Notice: Subject to any disclaimer, the term of this patent is extended or adjusted under 35 U.S.C. 154(b) by 7 days.

This patent is subject to a terminal disclaimer.

(21) Appl. No.: 16/856,256

(22) Filed: Apr. 23, 2020

(65) Prior Publication Data
US 2020/0341488 A1 Oct. 29, 2020

Related U.S. Application Data

(60) Provisional application No. 62/837,797, filed on Apr. 24, 2019.

(51) Int. Cl.
| | | |
|---|---|---|
| G05D 1/02 | (2020.01) | |
| A63F 9/24 | (2006.01) | |
| G05D 1/00 | (2006.01) | |
| G06K 7/14 | (2006.01) | |
| G06K 19/06 | (2006.01) | |

(52) U.S. Cl.
CPC ............ *G05D 1/0276* (2013.01); *A63F 9/24* (2013.01); *G05D 1/0094* (2013.01); *G05D 1/0212* (2013.01); *G05D 1/0231* (2013.01); *G06K 7/1456* (2013.01); *G06K 19/06131* (2013.01)

(58) Field of Classification Search
None
See application file for complete search history.

(56) References Cited

U.S. PATENT DOCUMENTS

| | | | | |
|---|---|---|---|---|
| 4,278,142 A | * | 7/1981 | Kono | G05D 1/0234 180/168 |
| 4,439,672 A | * | 3/1984 | Salaman | G21F 9/305 235/454 |
| 4,628,453 A | | 12/1986 | Kamejima | |

(Continued)

FOREIGN PATENT DOCUMENTS

| | | |
|---|---|---|
| EP | 3128484 | 6/2018 |
| GB | 2552648 | 2/2018 |

(Continued)

OTHER PUBLICATIONS

A Robot Indoor Position and Orientation Method based on 2D Barcode Landmark, JCP 6.6 (2011): 1191-1197. Lin.

(Continued)

*Primary Examiner* — Jason T Yen
(74) *Attorney, Agent, or Firm* — Adam K. Sacharoff; Much Shelist, P.C.

(57) ABSTRACT

The present invention relates to a method and apparatus to determine the position of an image sensor relative to a predetermined continuous pattern of colors and/or objects based on the images said patterns of colors and/or objects produces within the image sensor.

22 Claims, 10 Drawing Sheets

(56) References Cited

U.S. PATENT DOCUMENTS

| | | | |
|---|---|---|---|
| 4,777,601 A * | 10/1988 | Boegli | G05D 1/0244 |
| | | | 701/23 |
| 5,051,906 A | 9/1991 | Evans, Jr. et al. | |
| 5,525,883 A * | 6/1996 | Avitzour | G05D 1/0274 |
| | | | 318/568.1 |
| 5,870,136 A | 2/1999 | Fuchs | |
| 5,999,866 A | 12/1999 | Kelly | |
| 6,781,618 B2 | 8/2004 | Beardsley | |
| 6,868,307 B2 | 3/2005 | Song | |
| 7,184,586 B2 | 2/2007 | Jeon | |
| 7,231,063 B2 | 6/2007 | Naimark | |
| 8,229,228 B2 | 7/2012 | Petricoin | |
| 9,245,163 B2 | 1/2016 | Thwing | |
| 9,307,232 B1 | 4/2016 | Warner | |
| 9,756,277 B2 | 9/2017 | Partouche | |
| 9,778,029 B2 | 10/2017 | Yamaguchi | |
| 9,927,814 B2 | 3/2018 | Wise | |
| 9,933,252 B2 | 4/2018 | Yamaguchi | |
| 2002/0104716 A1 | 8/2002 | Zaharia | |
| 2006/0184013 A1 | 8/2006 | Emanuel | |
| 2007/0248283 A1 | 10/2007 | Mack | |
| 2012/0193424 A1 | 8/2012 | Al-Omari | |
| 2016/0313740 A1 * | 10/2016 | Deutscher | G05D 1/0011 |
| 2017/0041592 A1 | 2/2017 | Hwang | |
| 2017/0249745 A1 | 8/2017 | Fiala | |
| 2017/0332872 A1 | 11/2017 | Jun | |
| 2019/0096068 A1 | 3/2019 | Fontanel | |
| 2019/0156086 A1 | 5/2019 | Plummer | |
| 2019/0302879 A1 | 10/2019 | Schwarz | |
| 2020/0101971 A1 * | 4/2020 | Fan | G01S 17/04 |

FOREIGN PATENT DOCUMENTS

| | | |
|---|---|---|
| KR | 1911957370000 | 1/2012 |
| WO | 2011144710 | 11/2011 |
| WO | 2018089041 | 5/2018 |

OTHER PUBLICATIONS

CyberCode: designing augmented reality environments with visual tags, Proceedings of DARE 2000 on Designing augmented reality environments, ACM, 2000. Rekimoto.

A survey of tracking technology for virtual environments; Fundamentals of wearable computers and augumented reality (2001): 67. Baillot.

Real-time single camera SLAM using fiducial markers; 2009 ICCAS-SICE. IEEE, 2009. Lim.

Localization and navigation using QR code for mobile robot in indoor environment; 2015 IEEE International Conference on Robotics and Biomimetics (ROBIO). IEEE, 2015. Zhang.

A versatile high-performance visual fiducial marker detection system with scalable identity encoding; Proceedings of the Symposium on Applied Computing. ACM, 2017. Lightbody.

Scanning camera and augmented reality based localization of omnidirectional robot for indoor application; Procedia Computer Science 105 (2017): 27-33. Kundu.

U.S. Appl. No. 16/856,230 Copending Application; Office Action dated Jun. 19, 2020.

PCT/US2020/029682; Aug. 7, 2020, PCT Search Report.

* cited by examiner

PERFORMANCE ARENA FOR ROBOTS WITH POSITION LOCATION SYSTEM

CROSS REFERENCE TO RELATED APPLICATIONS

The present invention claims priority to U.S. Provisional Application 62/837,797 filed Apr. 24, 2019 and hereby incorporates the application in its entirety.

BACKGROUND

Technical Field of the Invention

The present invention is related to performance arenas for robots and position location systems based on patterns sensed by image sensors.

State of the Prior Art

Various robots, including automated vehicles and other self-propelled devices, are designed for performing various functions or operations, often in a particular area of operation or performance arena. Such functions may include, but are not limited to, manufacturing tasks, service tasks, and competitions. In such performances, it is often desirable or even necessary for such robots to be in, or move to, various positions in the performance arena, or even to have the capability of tracking itself to determine and use their particular positions within such performance arenas. Some such position location systems are known, but improvements in speed, simplicity, computational economy, and versatility are still needed.

The foregoing examples of the related art and limitations related therewith are intended to be illustrative and not exclusive. Other limitations of the related art and other examples of related art will become apparent to those of skill in the art upon a reading of the specification and a study of the drawings.

SUMMARY

The following embodiments and aspects thereof are described and illustrated in conjunction with systems, structures, methods, and implementations which are meant to be examples and illustrative, not limiting in scope. In various embodiments and implementations, one or more problems have been reduced or eliminated, while other embodiments are directed to other improvements and benefits.

In one embodiment, a performance arena system for vehicles that perform in a performance space, the performance arena system comprising a coded strip that has a beginning end and extends a predetermined length to a terminal end and has a predetermined number of interval distances extending from a the beginning end to the terminal end, wherein the coded strip is mountable at a starting position adjacent to the performance space and extendable for the predetermined number of interval distances adjacent to the performance space.

In another embodiment the coded strip comprises a code center line and is mountable adjacent to the performance space in a manner that defines a reference plane above a performance surface, and wherein a sequence of code marks in the coded strip includes a non-repeating sequence of blocks at regularly spaced intervals along the code center line.

In another embodiment the non-repeating sequence of blocks includes dark blocks interspersed with light blocks.

In another embodiment some of the dark and light blocks are positioned above the code center line, and wherein some others of the dark and light blocks are positioned below the code center line.

In another embodiment any interval that has a dark block above the code center line has a light block below the code center line, and wherein any interval that has a light block above the code center line has a dark block below the code center line such that transitions of light blocks to dark blocks above the code center align with transitions of dark blocks to light blocks below the code center line, and such that transitions of dark blocks to light blocks above the code center line align with transitions of light blocks to dark blocks below the code center line, wherein intersecting corners of dark blocks above the code center line with corners of dark blocks below the code center line form feature points on the code center line.

In another embodiment a positioning device positioned in the performance space that includes a digital camera for acquiring an image comprising one or more of the portions of the sequence of marks, the digital camera having a lens system for focusing the image on an image sensor, the lens system having an optical center.

In another embodiment a processor programmed to compare the image acquired by the digital camera to the sequence of marks in a memory to identify the one or more portions of the sequence of marks in the image and to generate signals that are indicative of the position and the orientation of the positioning device in the performance space.

In another embodiment the positioning device is mountable on a vehicle in a manner that positions the optical center in the reference plane.

In another embodiment the processor is programmed to identify the code center line by the feature points formed by the intersecting corners of dark blocks above the code center line with corners of dark blocks below the code center line form feature points on the code center line.

In another embodiment the processor is programmed to identify the locations of the feature points in the image as respective locations of such features points on the coded strip and thereby the locations of such features on the perimeter of the arena with respect to the starting position by identifying the corresponding locations of the respective feature points in the sequence of marks and the specific locations around the arena in the memory.

In another embodiment the performance surface has a polygon shape and the performance space is surrounded by walls that intersect at corners, and wherein the starting position is one of the corners.

In another embodiment a performance arena system comprises (i) a coded strip which extends around at least a portion of a perimeter of an arena space above a performance surface, said coded strip comprising a sequence of code marks beginning at a starting position, wherein portions of the sequence of marks at any specific position adjacent to the arena space in relation to the starting position are unique to such specific position; (ii) a positioning device positioned in the arena that includes a digital camera for acquiring an image comprising one or more of the portions of the sequence of marks; and (iii) a processor programmed to generate signals that are indicative of the position and the orientation of the positioning device in the arena based on the portion or portions of the sequence of marks in the image.

In another embodiment a method of assembling a performance arena, comprising placing a coded strip at least partially around or in the performance arena, wherein the coded strip has a beginning end and a terminal end with the a code length between the beginning end and the terminal end, and the placing of the coded strip at least partially around or in the performance arena places the beginning end at a starting position in relation to the performance arena that has a particular location in relation to the performance arena, and wherein the coded strip comprises a plurality of feature points in the code length between the beginning end and the terminal end with each feature point being at a predetermined distance from the beginning end so that each of the feature points in the code length is at the respective predetermined distance from the starting position.

In another embodiment the method includes assembling a plurality of walls around a performance space to intersect each other at a plurality of corners, designating one of the corners as the starting position, and mounting the coded strip on the walls with the beginning end of the coded strip positioned at the corner that is designated as the starting position, whereby each of the feature points in the coded strip is located at the respective predetermined distance from the corner that is designated as the starting position.

In another embodiment the method includes assembling a plurality of walls on a performance surface and mounting the coded strip on the walls such that a center line of a code on the coded strip is at a constant height above the performance surface.

BRIEF DESCRIPTION OF THE DRAWINGS

The accompanying drawings, which are incorporated herein and form a part of the specification, illustrate some, but not the only or exclusive, example embodiments and/or features. It is intended that the embodiments and figures disclosed herein are to be considered illustrative rather than limiting. In the drawings.

DETAILED DESCRIPTIONS OF EXAMPLE EMBODIMENTS

Figure 1:
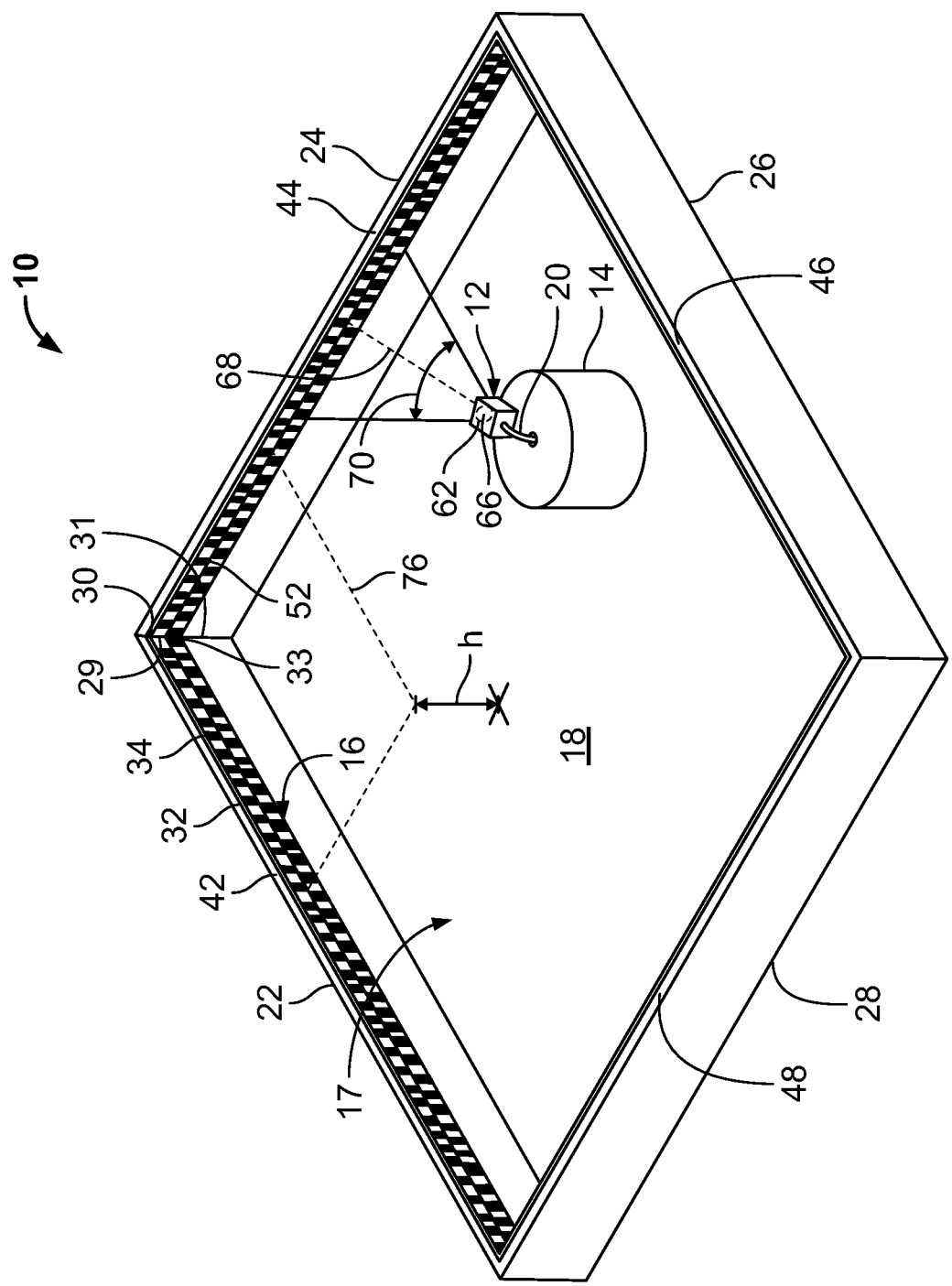
FIG. 1 is an isometric view of an example robot performance arena with a diagrammatic illustration of an example positioning device mounted on a robot.

An example performance arena 10 for robots or other vehicles is shown in FIG. 1 with an example positioning device 12 mounted on a vehicle, e.g., the robot 14, in the performance arena 10. A coded strip 16 extends at least partially around the perimeter of an performance space 17 above a performance surface 18. The vehicle 14 can be an automated, self-propelled, or other vehicle or device that can move or be moved in various paths on the performance surface 18 to various positions within the performance arena 10. For purposes of this description, the terms vehicle and robot are used interchangeably as a convenience to describe the entire system or method, since the particular kind of vehicle 14 on which the positioning device 12 may be mounted is not a limiting feature of the invention. For example, but not for limitation, the example vehicle 14 illustrated diagrammatically in FIG. 1 can be a competition robot that may be tasked with performance of various mandated operations, maneuvers, or achievement of various goals within the performance arena 10. The positioning device 12 mounted on the robot 14 provides signals to the robot 14 that are indicative of the position and orientation of the positioning device at any particular time or changes in such positions and orientations on a real-time basis. Such position signals can be used by the robot 14 in any manner desired by a robot designer or operator to perform operations or achieve goals. The robot 14 is illustrated to facilitate this explanation of the usefulness of the performance arena 10 and positioning device 12, but the robot 14 itself and any particular programming of the robot 14 to use the position signals provided by the positioning device 12 are not part of this invention. Accordingly, the positioning device 12 is illustrated diagrammatically as being mounted on the robot 14 with an electric data cable 20 for providing such position signals to the robot 14, although such signals can also be transmitted wirelessly from the positioning device 12 to the robot 14 in any other convenient manner or format known in the art, e.g., frequency modulated electro-magnetic radiation, infra-red, sound, etc.

While the example robot performance arena 10 is illustrated as a square arena in FIG. 1, it can be other shapes, for example, a rectangle, polygon, circle, oval, or other shapes. Also, the illustrated example components, such as the length and height of the sides or walls around the performance arena 10, the area of the performance surface 18, the sizes of the robot 14 and positioning device 12, etc., are not illustrated in any particular scale or relative sizes in relation to each other due to paper limitations, but persons skilled in the art will understand the principles after becoming familiar with the explanations of the components below. As an illustrative example, the rectangular performance arena 10 may have walls 22, 24, 26, 28, each twelve feet long and twelve inches high. The coded strip 16 is illustrated in FIG. 1 as extending from its beginning end 29 positioned at a predetermined starting position 30 (sometimes called starting position 30 in this description) on the perimeter of the performance arena 10, for example, at a particular corner 31 of the performance arena 10, and extending around the perimeter of the performance arena 10 to a terminal end 33 of the coded strip 16 back at the starting position 30. However, the coded strip 16 could extend only part of the way around the perimeter or along several parts of the perimeter, or it could instead extend through the performance space or around or partially around an object in the performance space, as long the coded strip 16 has a known starting position in relation to the performance arena 10 and at least a portion of the coded strip 16 can be captured in an image by the positioning device 12. In other words, the coded strip 16 is positioned adjacent to the performance space in some manner or position that has a starting position at a known location in relation to the performance space of the performance arena and in which a positioning device 12 in the performance space can capture an image of at least a portion of the coded strip 16 that has sufficient feature points to enable the positioning device 12 to determine the location of the positioning device 12 in the performance space. The exact location of every feature point 60 (FIGS. 3, 4, 6, and 7) in the coded strip 16 is known by design of the code. In other words, the exact distance of each feature point 60 from the beginning end 29 of the coded strip 16 is known from the design of the code, Therefore, by mounting or placing the coded strip 16 on the walls 22, 24, 26, 28 with the beginning end 29 of the coded strip 16 precisely at the designated starting position 30, for example, at the designated corner 31 of the example square performance arena 10 illustrated in FIG. 1, the exact distance of every feature point 60 in the coded strip 16 from the designated corner 31 of the performance arena 10 is known. Accordingly, the precise location of every feature point 60 in the coded strip 16 in relation to the designated corner 31 is known.

In this example, the coded strip 16 may be applied to the walls 22, 24, 26, 28 in any convenient manner. For example, the code can be printed on any convenient substrate material 32, including, for example, printed with any known printing process and materials onto a material 32, such as paper, plastic, wood, or other material and made for mounting on the walls 22, 24, 26, 28. In one example, the substrate material 32 can have a self-adhesive back surface that can be used to adhere the substrate material 32 with the coded strip 16 onto the walls 22, 24, 26, 28. An example substrate material 32 may have the coded strip printed or otherwise applied on a front (exposed) surface of the substrate material 32 extending to a top edge 34 of the substrate material 32 so that mounting the substrate material 32 on the walls 22, 24, 26, 28 with the top edge 34 of the substrate material 32 in alignment with the top edges 42, 44, 46, 48 of the walls 22, 24, 26, 28, which are parallel to the performance surface 18, is a convenient way of mounting the coded strip 16 parallel to the performance surface 18 at a consistent height above the performance surface 18. Of course, the coded strip 16 can be silkscreened, laser etched, printed, painted, or formed in any other manner. Accordingly, multiple robot performance arenas 10 of uniform shape and dimensions can be conveniently and easily assembled, for example, for competition robot performance arenas in different locations for standardized competition rules and performance features and capabilities, as will be explained in more detail below. For example, multiple coded strips 16 identical to each other can be produced very easily and mounted in different performance arenas 10 that conform in size and shape to the specific size and shape for which such coded strips 16 are designed. For example, robot competitions are held in various cities around the world, and robots equipped with the positioning device 12 could perform and compete without calibration in any of such competitions that use performance arenas that are sized and fitted with replications of the same coded strips 16. As another example, an umbrella sponsor or organizer of robotic competitions, e.g., Robotics Education and Competition Foundation, may prescribe a particular performance arena 10 shape and size for robotic competitions to be performed under its auspices, and such sponsor or organizer can print or otherwise produce multiple copies of the coded strip 16 in the precise dimensions that fit the prescribed performance arena 10 shape and size. A local organizer of a local robotics competition, e.g., a grade school, high school, college, or club, that wants to hold a local robotics competition that conforms to the rules, challenges, and other requirements of the umbrella sponsor or organizer can simply build a local robot performance arena 10 of the shape and size prescribed by the umbrella sponsor or organizer, and the umbrella sponsor or organizer can provide the coded strip 16 to the local organizer for mounting as prescribed on the local organizer's performance arena 10. The coded strip 16 can be provided in one piece, or it can be provided in several pieces, e.g., one piece for mounting on each of the four walls 22, 24, 26, 28 of the example square performance arena 10 in FIG. 1, but, regardless of the number of pieces, the coded sequence extends from the starting position 30 at least some distance adjacent to the performance space 17, which can be, but does not have to be, at least partially around the perimeter of the performance arena 10. In the example performance arena 10 illustrated in FIG. 1 the coded sequence extends from the starting position 30 all the way around the perimeter of the performance space 17 and back to that starting position 30. Accordingly, a large number, e.g., hundreds, of precisely located feature points 60 can be positioned and mounted easily by a user with only minimal instructions and without having to measure for the placement of each feature point around the performance space 17. In the example square performance arena 10 described above, the local organizer need only mount the coded strip 16 around the performance arena 10 with its starting edge 30 placed in the corner 31 of the performance arena 10, whereupon the precise location of every feature point 60 in the coded strip 16 on the local performance arena 10 will be known precisely in relation to the corner 31 without need for further measuring or aligning, the same as every other local, regional, or worldwide performance arena 10 that is constructed and equipped in this same manner. Accordingly, robots equipped with the positioning device 12 as described above and that are programmed to perform in such a local performance arena 10 can also perform in all other such performance arenas 10 that are built and equipped in the same way without reprogramming its positioning features. In another embodiment, the coded strip 16 can also be formed of segments of unique codes individually positioned such as to align such segments with various predetermined alignment features on walls or other surfaces to which they are affixed. This arrangement can simplify the manufacture or installation of the coded strips 16 on multiple performance arena 16 replicas and still provide the precise alignment of the code strip 16 in each such performance arena 16 for use by the positioning device 12 as described herein.

Figure 3:
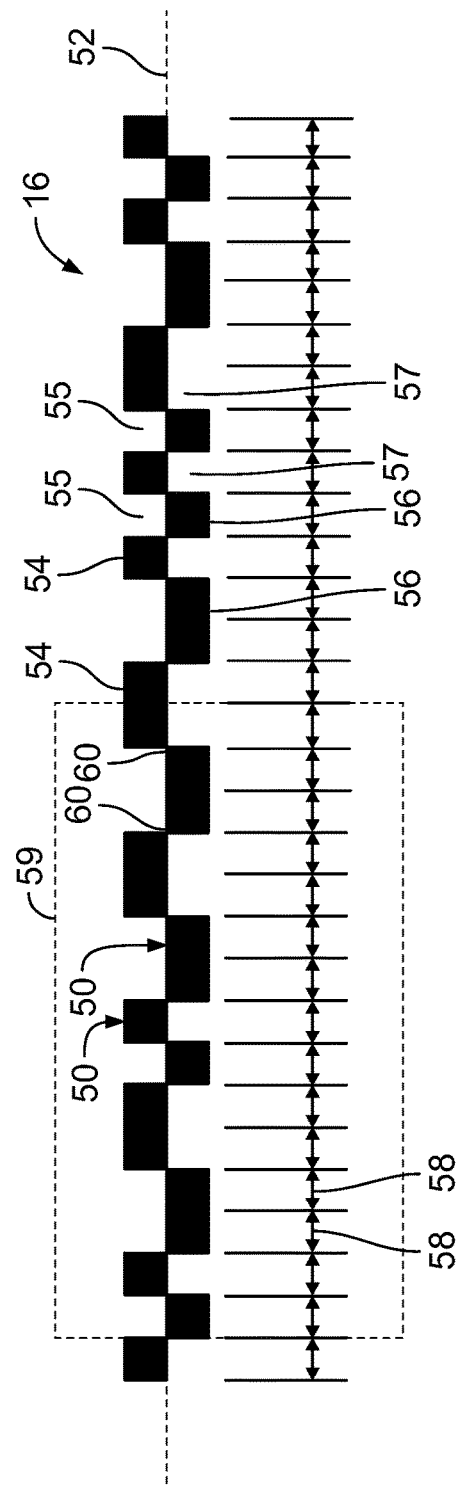
FIG. 3 is an enlarged view of a portion of the example code strip in FIG. 1.

Referring now to the example coded strip 16 in FIG. 1 in combination with an enlarged view of a portion of the example coded strip 16 in FIG. 3, the example coded strip 16 comprises a predetermined sequence of code marks 50 beginning at the starting position 30 and extending along a code center line 52 around the perimeter of the performance arena 10 to end back at the starting position 30. Certain portions of the sequence of marks 50 at any specific position around the performance arena 16 are unique to such specific position. The sequence of code marks 50 includes a non-repeating sequence of dark blocks 54, 56 and light blocks 55, 57 at intervals 58 along the code center line 52 such that the intervals 58 and blocks 54, 55, 56, 57 extend from the starting position 30 around the perimeter of the performance arena 10 and back to the starting position 30. In the example coded strip 16, the intervals 58 are regularly spaced, i.e, of equal interval width, although they could be different widths in some implementations. Some of the blocks, e.g., dark blocks 54 and light blocks 55, are above the code center line 52, and some of the blocks, e.g., dark blocks 56 and light blocks 57, are below the code center line 52. The dark blocks 54, 56 in the example coded strip 16 illustrated in FIGS. 1 and 3 are depicted as black blocks, and the light blocks 55, 57 in the example coded strip 16 are depicted as white blocks. Such black blocks 54, 56 and white blocks 55, 57 are convenient to produce by simply printing the black blocks 54, 56 on a white substrate material 32, whereby the white blocks 55, 57 appear in the intervals 58 between the black blocks 54, 56. However, the dark blocks 54, 56 and light blocks 55, 57 could be produced with contrasting colors, patterns, or other implementations. Accordingly, for purposes of this description, the terms dark blocks and light blocks include contrasting colors, patterns, and other implementations, regardless of intensity, as long as they are distinguishable from each other. For example, red blocks and blue blocks could be of equal intensity, yet distinguishable by suitable filtering or other processes. Also, for example, black blocks and white blocks are considered to be dark blocks and light blocks, respectively. As also illustrated in the example coded strip 16, some of the dark blocks 54, 56 are positioned in adjacent intervals 58, which effectively extend such adjacent dark blocks 54, 56 through two adjacent intervals and provide an appearance of a double-length dark block. Likewise, some of the light blocks 55, 57 are positioned in adjacent intervals 58, which effectively extend such adjacent light blocks 55, 57 through two adjacent intervals and provide an appearance of a double-length light block. Such dark blocks 54, 56 and light blocks 55, 57 are detectable.

In the example coded strip 16 illustrated in FIGS. 1 and 3, any interval 58 that has a dark block 54 above the code center line 52 has a light block 57 below the code center line 52, and wherein any interval 58 that has a light block 55 above the code center line 52 has a dark block 56 below the code center line 52, such that transitions of light blocks 55 to dark blocks 54 above the code center 52 align with transitions of dark blocks 56 to light blocks 57 below the code center line 52, and such that transitions of dark blocks 54 to light blocks 55 above the code center line 52 align with transitions of light blocks 57 to dark blocks 56 below the code center line 52. Accordingly, intersecting corners of dark blocks 54 above the code center line 52 with corners of dark blocks 56 below the code center line 52 form feature points 60 on the code center line 52 that are detectable.

The example coded strip 16 illustrated in FIGS. 1 and 3 and described above can be built of a pseudo random, maximal length sequence of dark blocks 54, 56 and light blocks 55, 57 of a length that extends from the starting position 30 around the perimeter of the performance arena 10 and back to the starting position 30 as explained above. Persons skilled in the art understand that maximal length sequences are the largest code sequences that can be constructed which do not repeat over the smallest sliding window, and persons skilled in the art know how to generate such maximal length code sequences, e.g., Galois linear feedback shift registers or Fibonacci linear feedback shift registers. MathWorks (trademark) MATLAB can be used to generate such code sequences with many desired possible maximal lengths. For example, the coded strip 16 can be built of a Manchester-encoded, pseudo random, maximal length sequence of black (dark) blocks 54, 56 and white (light) blocks of the length that extends from the starting position 30 around the perimeter of the performance arena 10 and back to the starting position 30. Persons skilled in the art understand that Manchester encoding encodes every bit of an unencoded bit sequence as two bits of the Manchester-encoded version of that unencoded sequence. A Manchester-encoded maximal length sequence of 255 is a convenient example. If the unencoded sequence comprises 255 bits, the Manchester-encoded version of that unencoded sequence will comprise 510 bits—exactly twice the number of bits as the unencoded bit sequence. Specifically, Manchester encoding replaces each high bit of the unencoded sequence with a high bit followed by a low bit in the Manchester-encoded version of the bit sequence. Manchester encoding replaces each low bit of the unencoded bit sequence with a low bit followed by a high bit in the Manchester-encoded version of the bit sequence. In the example coded strip 16, a bit sequence formed from an 8 bit linear feedback shift register (LFSR) as a maximal length, pseudo random bit sequence of length 255 is Manchester-encoded to result in a Manchester-encoded bit sequence of length 510 bits, a window 59 (FIG. 3) with a width of fifteen (15) consecutive intervals 58 can be slid along every possible position over the entire length of the coded strip 16, including spanning across the starting position 30, and never contain a 15-interval code sequence that repeats anywhere around the performance arena 10

It may be noted, however, that the sequences do not have to be maximal length sequences. The requirement is that the sequence is non-repeating over a minimal sliding window. If a maximal length sequence is not used, then a sliding window containing more intervals 58 will have to be used to ensure that the sliding window does not see any repeating pattern across the window anywhere around the performance arena 16. In other words, use of a non-maximal length sequence means that the image sensor 64 would have to observe more contiguous, unobstructed bits in order for the imaging device 12 to be able to unambiguously determine position. Thus, in contrast to use of maximal length sequence as described above, use of a non-maximal length sequence would require that the image sensor 64 would have to image more than a 15-interval code sequence.

The example maximal length sequence coded strip 16 is further encoded such that each interval 58 comprises a black block 54 above the code center line 52 and a white block 57 below the code center line 52 to indicate a high bit of the Manchester-encoded sequence of the coded strip 16, or a white block 55 above the center line 52 and black block 56 below the center line 52 to indicate a low bit of the Manchester-encoded sequence of the coded strip 16. Such an arrangement allows for decoding the coded strip 16 or portions of the coded strip 16 with a zero-mean filter as will be described in more detail below. With the predetermined, non-repeating code of the coded strip 16 mounted around the perimeter of the performance arena 10 as shown in FIG. 1 and described above, the precise location in three dimensions of each feature point 60 in the coded strip 16 is known by design, and there are hundreds of such feature points 60 in such precisely known locations around the perimeter of the performance arena 10. As mentioned above, the feature points 60 can be detected.

Figure 2:
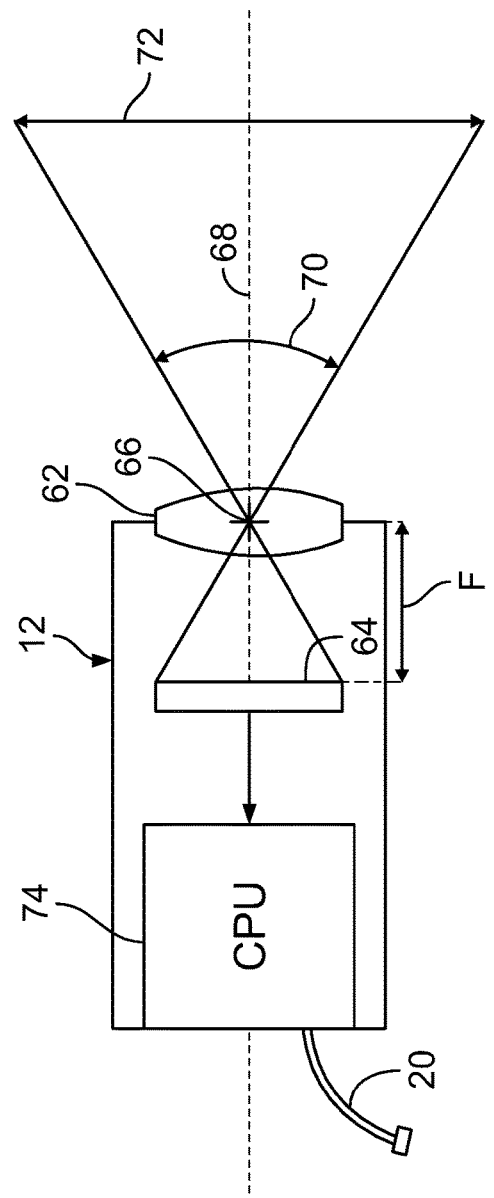
FIG. 2 is a diagrammatic side elevation view of the example positioning device in FIG. 1.

Referring now primarily to FIGS. 1 and 2, the example positioning device 12 comprises a digital camera with a lens system 62 for focusing an image of at least a portion of the coded strip 16 onto an image sensor 64. The lens system 62 can be any of myriad conventional digital camera lens systems for providing appropriate focusing and scaling of the image onto the image sensor 64 as are well-known to persons skilled in the art of digital cameras, including, for example, a single lens or a combination of lenses. The camera lens system 62 has an effective optical center 66 for projecting and focusing of the image onto the image sensor 64. The effective optical center 66 is the point about the lens system 62 where a virtual pinhole would be placed to best approximate the imaging function of the lens system 62 upon the image sensor 64. In other words, the optical center 66 is the point through which pass all rays extending between imaged objects and their corresponding image as projected onto the image sensor 64 by the lens system 62, as is also understood by persons skilled in the art of digital cameras, and the optical axis 68 of the lens system 62 extends through the optical center 66 and perpendicular to the plane of the image sensor 64. The focal length F is the distance from the optical center 66 to the image sensor 64. The angle of view 70 is set by the focal length F of the lens system 62 and the dimensions of image sensor 64. The number of intervals 58 of the coded strip 16 that are imaged on the image sensor 64 for a particular field (angle) of view 70 varies as a function of the distance of the optical center 66 to that portion of the coded strip 16 that is being imaged onto the image sensor 64. A wider field (angle) of view 70 would be desirable for imaging a sufficient number of code marks 50 to enable the positioning device 12 to establish the precise position of the optical center 66 in the performance arena 16 even when the robot 14 and positioning device 12 are close to the coded strip 16. However, for precise identification of the code blocks 54, 55, 56, 57 and feature points 60 in the decoding process, it is also desirable for the image of the coded strip 16 captured by the image sensor 64 to have as many pixels per code block 54, 55, 56, 57 as possible, even when the robot 14 and positioning device 12 are positioned a longer distance from the coded strip 16. Accordingly, the design of the focal length F and size of the image sensor 64 for a desirable field of view 70 may involve an engineering trade-off between providing a wide enough field of view 70 for the robot 14 and positioning device 12 to move to positions fairly close to the coded strip 16 and still capture the minimum number of code marks 50 and features 60 for the positioning device to establish the position of the optical center 66 in the performance arena 10 at such close distances, yet also a narrow enough field of view 70 for the image sensor 64 to capture enough pixels per code block 54, 55, 56, 57 when the robot 14 and positioning device 12 move to positions in the performance arena 10 far away from the coded strip 16 to enable the positioning device 12 to establish such far away positions of the optical center 66 in the performance arena 10.

The example positioning device 12 includes a digital processor 74, e.g., CPU, for establishing the positions of the optical center 66 of the positioning device 12 based on images of portions of the encoded strip 16, as will be described in more detail below, and outputs signals that are indicative of such positions. In general, use of the terms "position" and "location" in reference to the optical center 66 includes spatial location as well as angular orientation of the optical center 66 unless the context indicates otherwise. With the positioning device 12 mounted on a robot 14 as illustrated diagrammatically for example in FIG. 1, establishment of any particular location of the optical center 66 in the performance arena 10 can be correlated to particular locations of the robot 14 or components of the robot 14 in the performance arena 10 by simply knowing the relevant dimensions of the robot 14 and the position at which the optical center 66 is mounted on the robot 14. The output signals produced by the CPU 74, which are indicative of the locations of the optical center 66, are provided by the CPU 74 to the robot 14 through the electric data cable 20 or by other means, and such signals can be utilized in any manner designed into, or determined by, the robot 14 for use in performing operations, maneuvers, or tasks.

The coded strip 16 is preferably mounted with the code center line 52 at a uniform height h above the performance surface 18 all the way around the performance arena 10 as illustrated diagrammatically in FIG. 1. As mentioned above, alignment of the top edge 34 of the substrate material 32, thereby the top of the coded strip 16, with the top edges 42, 44, 46, 48 of the walls 22, 24, 26, 28 can facilitate such mounting of the coded strip 16 with the code center line 52 at such uniform height h above the performance surface 18. As such, the code center line 52 around the performance arena 10 defines a plane (indicated diagrammatically by the phantom lines 76) at the height h above the entire performance surface 18 of the performance arena 10. The positioning device 12 is positioned in the performance arena 10 with the optical center 66 and optical axis 68 preferably, but not necessarily, located in the plane 76, i.e., at the height h above the performance surface. Accordingly, a robot 14 builder that wants to utilize the example positioning device 12 with such robot 14 may mount the positioning device 12 on the robot 14 at a position on the robot 14 that places the optical center 66 at the height h above the performance surface 18 as illustrated in FIG. 1. In such position, the optical axis 68 of the camera in the positioning device 12 falls in the plane 76, and, as such, the feature points 60 will always lie in a straight line in the captured image 104.

Figure 4:
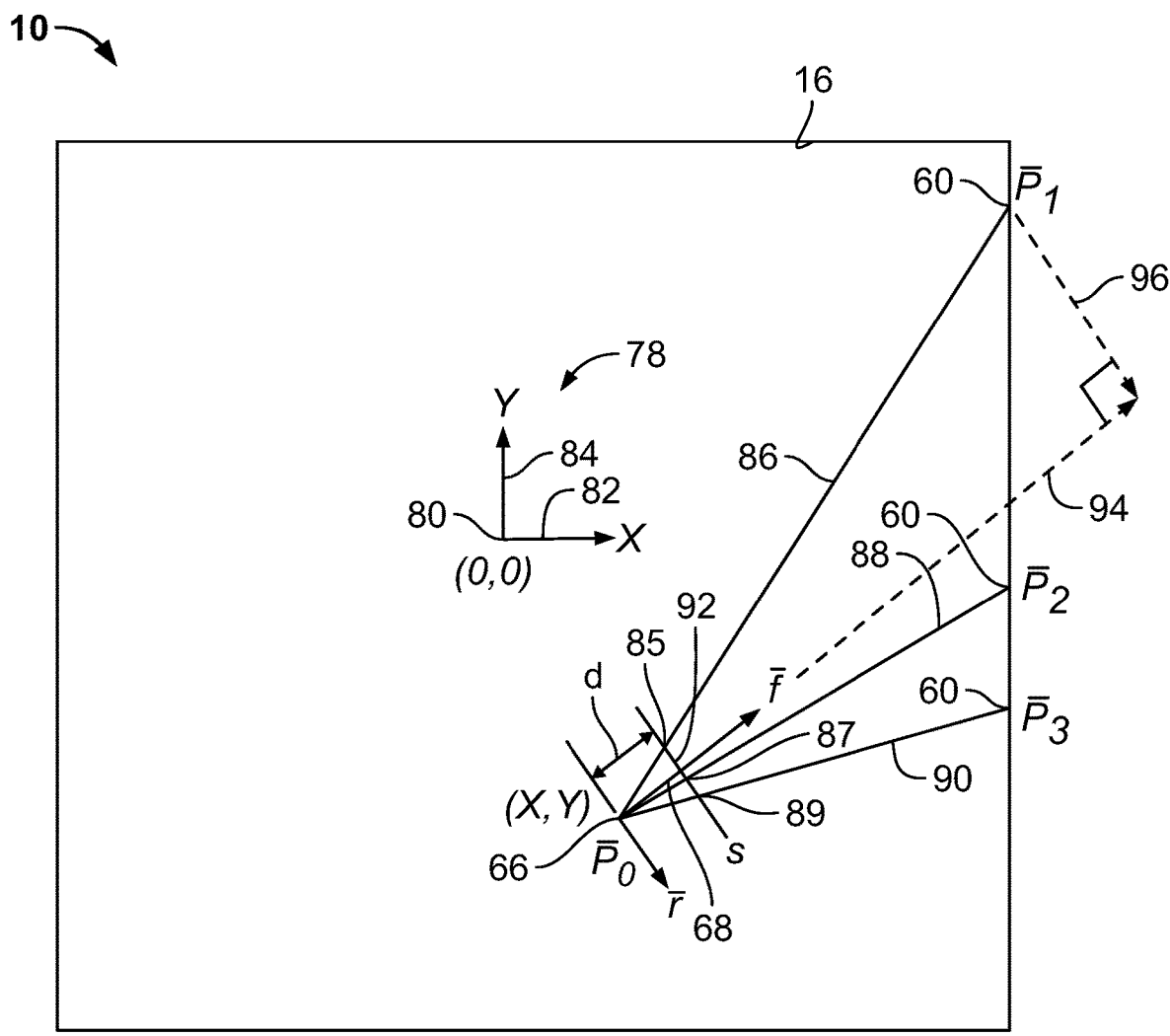
FIG. 4 is a diagrammatic plan view of the example robot performance arena in FIG. 1 showing an example coordinate system and local coordinates with example positioning feature diagrams.

Referring now primarily to FIG. 4, a coordinate system, for example, the Cartesian coordinate system 78, is associated with the performance arena 10. The origin 80 (0,0) of the coordinate system 78 is located at the center of the performance arena 10 with the positive x-axis 82 to the right and the positive y-axis 84 ahead (i.e., the positive x-axis 82 is to the right in the plane of the paper and the positive y-axis 84 is up in the plane of the paper). The optical center 66 of the positioning device 12 is located somewhere (x,y) in the performance arena 10, which is bounded by the coded strip 16 as explained above. The location of the optical center 66 also has a vertical (z) value, but the optical center 66 is always in the plane 76 at a height h above the performance surface 18, as explained above, so the vertical value (z) never changes and can be ignored. Also, there are always three angles involved with the position of the optical center 66, i.e, compass angle or yaw ($\phi$), pitch up or down ($\theta$), and roll (ψ). Accordingly, a complete description of the location of the optical center 66 would involve three spatial dimensions and three angular orientations (x,y,z,ϕ,θ,ψ). However, for simplicity and to avoid unnecessary repetition, the particular location values (x,y,z,ϕθψ) will only be included as needed for particular calculations or steps. In this example, ignoring the vertical (z) value as explained above, the actual (x,y,ϕθ,ψ) location of the optical center 66 (represented in FIG. 4 as $\overline{P}_0$) in the performance arena 10 is established by the positioning device 12 with a process that begins by capturing an image with the image sensor 62 (FIG. 2) of a portion of the coded strip 16 that includes more than some minimum number of feature points 60, as will be described in more detail below (and as alluded to above in the description of the sliding window 59 in FIG. 3), and then makes an initial prediction or guess for the (x,y) location of the optical center 66 and an initial angular orientation (ϕ,θ,ψ) of the optical axis 68, from which an initial prediction or guess for values s' on a virtual screen 92, where the prediction or guess assumes the respective rays 86, 88, 90 from the respective feature points 60 (e.g., $\overline{P}_1$, $\overline{P}_2$, and $\overline{P}_3$ in FIG. 4) will pass through the virtual screen 92. The actual s values at the respective points 85, 87, 89 on the virtual screen 92 where respective rays 86, 88, 90 from the respective feature points 60 (e.g., $\overline{P}_1$, $\overline{P}_2$, and $\overline{P}_3$ in FIG. 4) pass through the virtual screen 92 are then measured. Those actual s values correspond to pixels in the image captured by the image sensor 62. After computing an error metric E that is indicative of the differences between the predicted s' values and the measured s values, a new prediction is made for the location (x,y) of the optical center 66 and the angular orientation (ϕ,θ,ψ) of the optical axis 68 based on the gradient of the error metric E. In other words, a new assumption is made for the (x,y,ϕ,θ,ψ) coordinates of the optical center 66 and optical axis 68, and the process is repeated in an iterative manner until the error metric E descends to a predetermined satisfactory or acceptable value. The last location and angular coordinates (x,y,ϕθ,ψ) that result in the satisfactory or acceptable error metric E value is then output by the positioning device 12 as an accurate and precise representation of the actual location and angular orientation of the positioning device 12 in the performance arena 10 at that time. Of course, this process can be repeated by the positioning device 12 rapidly over and over again to output such position and angular coordinates (x,y,ϕ,θ,ψ) in essentially real time as the positioning device 12 is moved around in the performance arena 10, e.g., by a robot 14 on which the positioning device 12 may be mounted.

Figure 5:
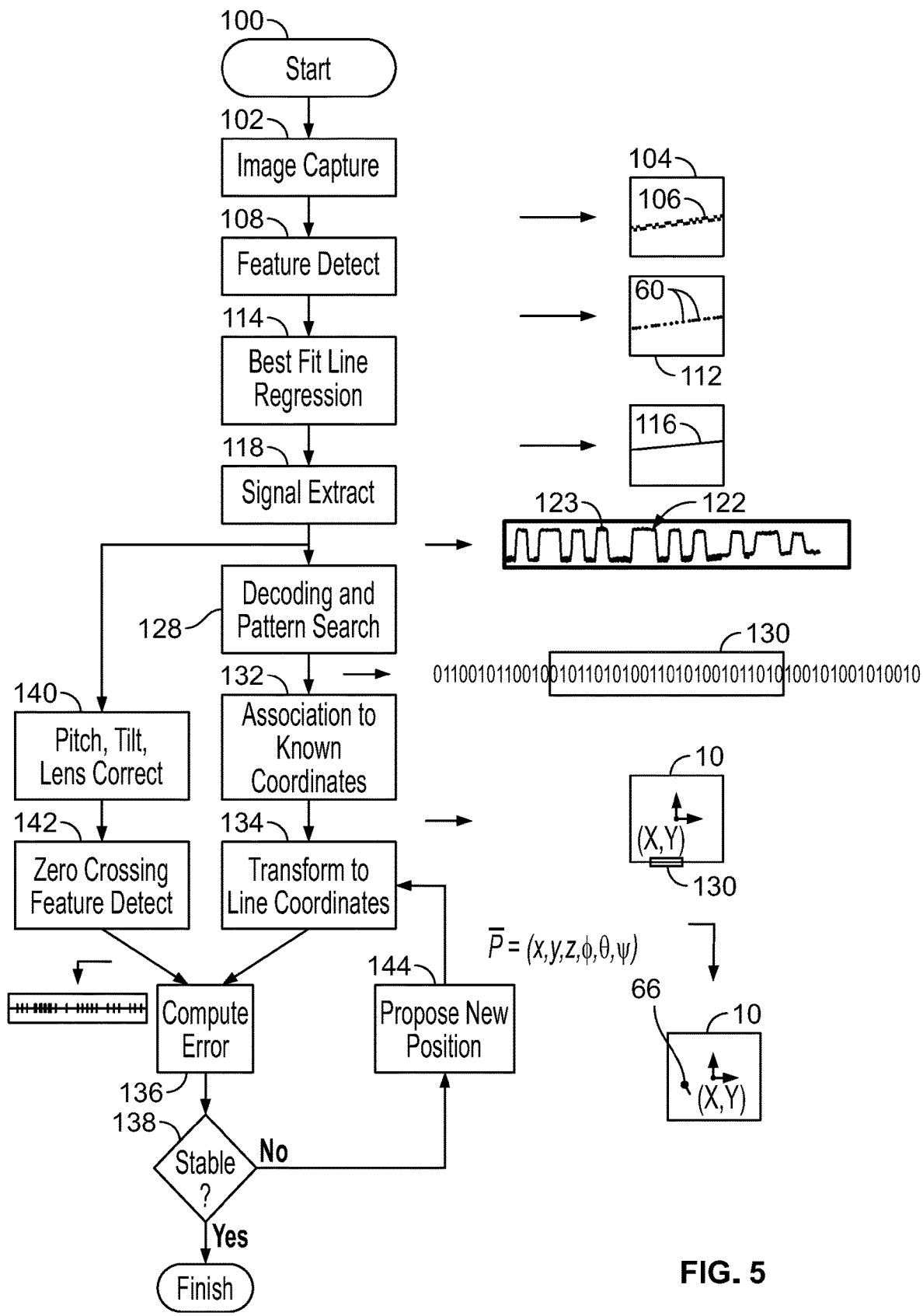
FIG. 5 is a logic diagram of an example process implemented by the positioning device for establishing a location of an optical center in the positioning device in the performance arena in FIG. 1.

Referring now primarily to FIG. 5 with secondary reference to various other figures to supplement this description, the example process to establish the location and orientation (x,y,ϕ,θ,ψ) of the optical center 66 of the positioning device 12 starts at 100. In the next step 102, the positioning device 12 captures an image of the portion of the coded strip 16 where the optical axis 68 (FIGS. 1-3), and thus also the image sensor 64, are pointed. An example of such a portion of the coded strip 16 is illustrated in FIG. 3, and, in the example image capture illustrated in FIG. 4, feature points 60 (e.g., $\overline{P}_1$, $\overline{P}_2$, and $\overline{P}_3$) form rays 86, 88, 90 to the optical center 66 passing through the virtual screen 92 at respective points 85, 87, 89, which correspond to pixel light detections by the image sensor 64. The intersections of the rays 86, 88, 90 with the virtual screen 92 describe the expected pixel location of the feature points 60 (e.g., $\overline{P}_1$, $\overline{P}_2$, and $\overline{P}_3$) in the recorded image. Transforms that describe such mapping of rays to pixel locations are known to persons skilled in the art, one example of which will be described in more detail below.

As explained above, with the predetermined, non-repeating code of the coded strip 16 mounted around the perimeter of the performance arena 10 as shown in FIG. 1 and as described above, the precise location in three dimensions of each feature point 60 in the coded strip 16 is known by design and is known in the memory associated with the CPU 74, and there are hundreds of such feature points 60 in such precisely known locations around the perimeter of the performance arena 10. One example coded strip 16 used in this description for the example 12 ft.×12 ft. performance arena 10 described above has five hundred ten (510) intervals 58 of equal length starting, for example, at the corner 30 (FIG. 1). In this example, there are four 12-foot walls 22, 24, 26, 28, thus a total coded strip 16 length of forty-eight (48) feet, which is five hundred seventy-six (576) inches. Accordingly, with that total length comprising five hundred ten (510) intervals 58, each interval 58 is 576/510=1.129 inches. As also mentioned above, the predetermined sequence of blocks 54, 56 in the example coded strip 16 is Manchester encoded to produce a series of equally spaced code bits that correspond to the equally spaced intervals 58. The example coded strip 16 illustrated in FIGS. 1 and 3 encodes each of the bits as either a white over black interval or a back over white interval. As also explained above, transitions of white blocks 55 to black blocks 54 above the code center 52 align with transitions of black blocks 56 to white blocks 57 below the code center line 52, and such that transitions of black blocks 54 to white blocks 55 above the code center line 52 align with transitions of white blocks 57 to black blocks 56 below the code center line 52. Accordingly, intersecting corners of black blocks 54 above the code center line 52 with corners of black blocks 56 below the code center line 52 form feature points 60 on the code center line 52 that are detectable. Since some of the black blocks 54 are adjacent to each other and some of the white blocks 56 are adjacent to each other, there are fewer transitions of white blocks 55 to black blocks 54 and vice versa above and below the code center line 52 than there are intervals 58. Accordingly, there are fewer identifiable feature points 60 than the five hundred ten (510) intervals 58, but there are still hundreds of such identifiable feature points 60 in the coded strip 16 at precisely placed and precisely known locations (x,y) around the performance arena 10.

Figure 6:
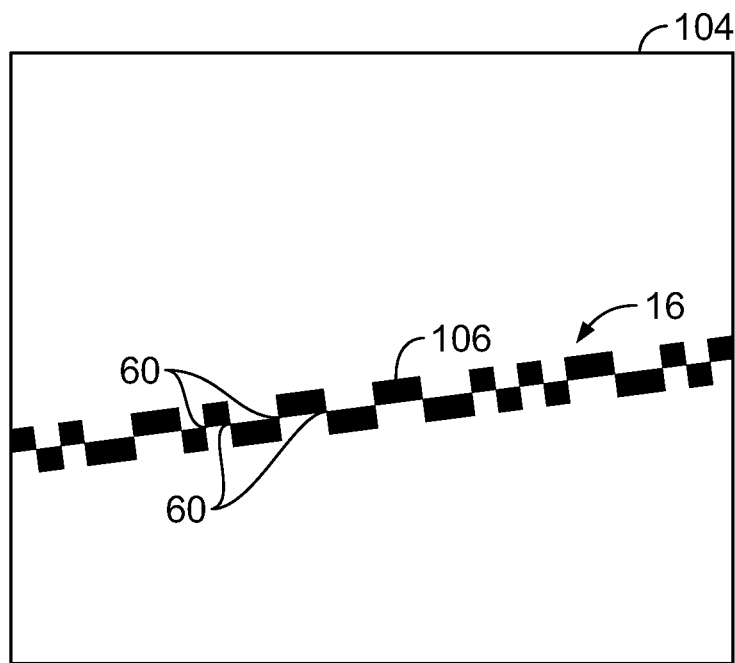
FIG. 6 is a diagrammatic representation of an example image of a portion of the example coded strip captured by the lens system in the positioning device in FIG. 1.
Figure 7:
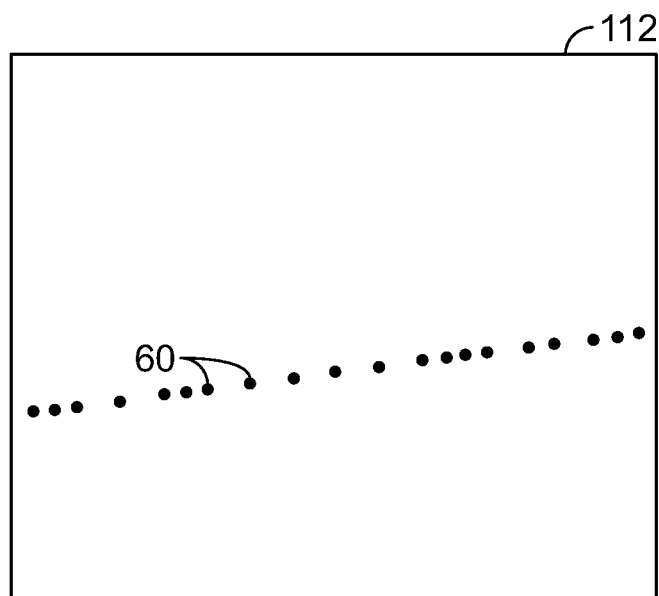
FIG. 7 is a diagrammatic representation of an example map of feature points in the coded strip created by convolution of the example image in FIG. 6 with a feature detection kernel.
Figure 8:
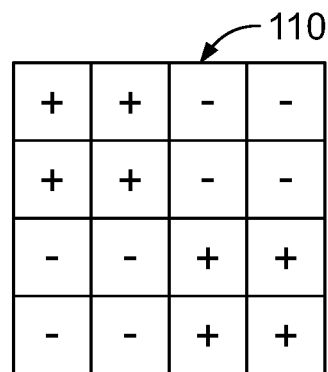
FIG. 8 is diagrammatic representation of an example kernel for use in the convolution that produces the example feature point map in FIG. 7.
Figure 9:
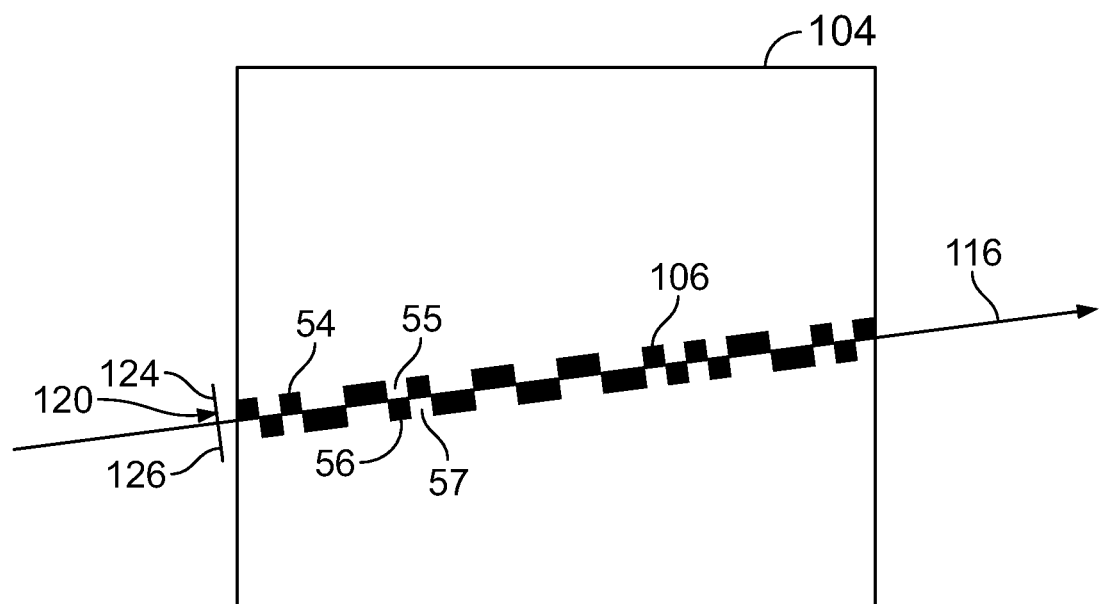
FIG. 9 is a diagrammatic representation of the example image of FIG. 6 overlaid with a line fitted to the center line of the coded strip and including a diagrammatic representation of the example zero-mean filter process used for detection of the code in the example image.

In the image capture step 102 in FIG. 5, the image 104 captured by the positioning device 12 comprises a portion 106 of the coded strip 16 as illustrated, for example, in FIG. 6. Then, in the feature detect step 108, the feature points 60 in the portion 106 of the coded strip 16 are detected by the CPU 74 as illustrated diagrammatically in FIG. 7. A monochrome image sensor 64 can be used in the positioning device 12 to reduce computation without degrading performance. In the example feature detect step 108, a convolution across the image 104 by a feature kernel 110 illustrated in FIG. 8 results in a feature map 112 with a number of feature point 60 responses in a substantially linear pattern as illustrated in FIG. 7. In the best fit line regression step 114, a line 116 is found to best represent the positions of the feature point 60 responses as illustrated in FIG. 9. The best fit line 116 corresponds with the code center line 52 of the coded strip 16 shown in FIGS. 1 and 2. The best fit line 116 is used in the signal extract step 118 to guide a zero-mean filtering process described below for decoding the portion 106 of the coded strip 16 that is captured in the image 104. To improve reliability and to reduce computational load, the coded strip 16 is mounted such that the code center line 52 is co-planar all the way around the performance arena 10 as explained above and illustrated in FIG. 1. Furthermore, the positioning device 12 is mounted on a robot 14 so that the optical center 66 remains in the plane 76 at the height h above the performance surface 18 as also described above and illustrated in FIG. 1. Thus, regardless of any position (x,y) and orientation ($\phi,\theta,\psi$), the code center line 52 will transform into best-fit lines 116 (FIG. 9), even across corners 30 where the end of one coded strip 16 section on one wall of the performance arena 10 meets the beginning of another coded strip section 16.

Figure 10:
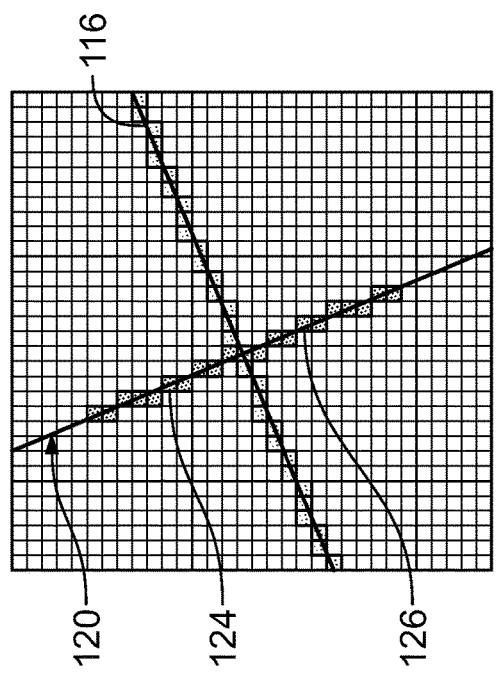
FIG. 10 is an enlarged diagrammatic view of the fitted line and the perpendicular line in pixel scale.
Figure 11:
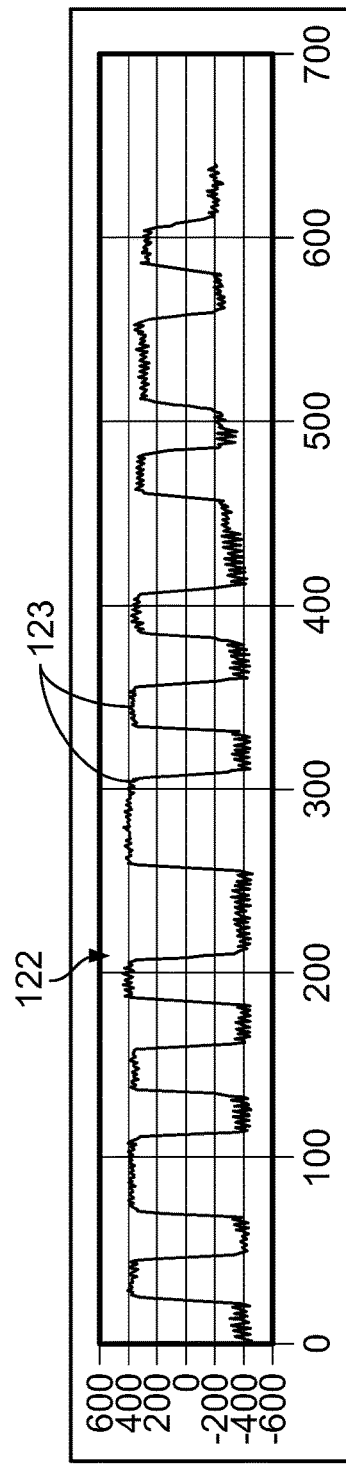
FIG. 11 is a graph of an example signal as detected by a zero-mean filter process from the example coded strip.

The zero-mean filtering process of the signal extract step 118 in FIG. 5 is illustrated in FIGS. 9 and 10. Pixels along a line 120 that is perpendicular to the best fit line 116 are processed to generate a detected signal 123, an example of which is illustrated in FIG. 11. In this example zero-mean filtering process illustrated in FIG. 10, pixel intensity values along the upper portion 124 of the perpendicular line 120 that are above the best fit line 116 are added to a sum, and pixel intensity values along a the lower portion 126 of the perpendicular line 120 that are below the best fit line 116 are subtracted from a sum. In other words, for a given position of the perpendicular line 120 as illustrated in FIG. 9, the amplitude of each pixel detected by the image sensor 64 on the upper portion 124 of the perpendicular line 120 above the best fit line 116 are multiplied by +1, and the amplitude of each pixel detected by the image sensor 64 on the lower portion 126 of the perpendicular line 120 below the best fit line 116 are multiplied by −1 and added to a sum. This sum is computed many times, once for each position of the perpendicular line 12, which is to say once for each perpendicular column of pixels in the portion 106 of the image 104 that crosses the best fit line 116. Accordingly, the filter gives a response of zero for any uniform area, i.e., it rejects the mean of the area. It is only sensitive to areas where the average brightness above the best fit line 116 is different than the average brightness below the best fit line 116. The number of perpendicular lines 120, i.e., vertical columns of pixels, per interval 58 (FIG. 3), i.e., per block 54, 55, 56, 57, varies dramatically depending on how far the lens system 62 of the positioning device 12 is positioned from the coded strip 16 (FIG. 1). If the lens system 62 is very close to the coded strip 16, there may be many (e.g., dozens) of perpendicular lines 120 (FIG. 9) in an interval 58 that are summed between them. On the other hand, if the lens system 62 far from the coded strip 16, e.g., near one wall of the performance arena 10 and looking at the opposite wall, there could be few, perhaps even less than two, vertical lines 120 that can be summed in an interval 58.

As a result of these zero-mean filtering operations, the detected signal 123 is generated, as illustrated for example in FIG. 11. The Manchester code present in the detected signal 123 is decoded in the decoding and pattern search step 128 in FIG. 5 using any of a variety of decoding techniques know to persons skilled in the art to reveal the encoded bit stream 130 of the pseudo random sequence of the portion 106 of the coded strip 16 in the captured image 104. A black block 54 over a white block 57 is encoded as a 1, and a white block 55 over a black block 56 is encoded as a 0 in this example. There is a minimum number of contiguous, unobstructed intervals 58 that must be captured in the image 104 in order for the CPU 74 of the imaging device 12 to determine which part of the code it sees, depending on the number of encoded bits in the smallest cluster or sequence of bits in the encoded bit stream that do not repeat anywhere in the coded strip 16, i.e., that is unique in the encoded bit stream. In this example coded strip 16 created as a maximal length pseudo random sequence of length 255 using an 8-bit linear feedback shift register and subsequently Manchester-encoded to obtain a bit sequence length of 510 bits as described above, the captured image 104 must include at least fifteen (15) contiguous, unobstructed intervals, e.g., 16.9 inches, in order to be able to determine which part of the code it sees, because sequences of fifteen (15) or more bits do not repeat anywhere in the bit stream. Accordingly, a subsection of the code can reveal the exact portion of the code that is captured in the image 104. Again, the memory associated with the CPU 74 contains the bit sequence for the entire coded strip 16. When the exact portion of the code is identified in the decoding and pattern search step 128, then such exact portion of the code is associated to the known coordinates (x,y) corresponding to the feature points 60 in that portion of the code as indicated at the association to known coordinates step 132 in FIG. 5. Relatively little computation time is expended to find the code strip image 106 in the captured image 104, and upon creating the detected signal 123, the position calculation reduces to a one-dimensional problem of relatively low complexity rather than one that involves computations in two-dimensional image space.

Once the known coordinates (x,y) corresponding to the feature points 60 are determined in step 132, those coordinates (x,y) are transformed to line coordinates s' in step 134 in FIG. 5 by a transformation process, which is sometimes called a perspective transformation and is well-known to persons skilled in the art of computer graphics. In one example of such transformation, the positioning device 12 in FIG. 1 has imaged the portion of the coded strip 16 that includes the feature points 60 (e.g., $\overline{P}_1$, $\overline{P}_2$, and $\overline{P}_3$) best seen in FIG. 4 and has identified $\overline{P}_1$ from the information about the coded strip 16 stored in the memory associated with the CPU 74 as explained above. Therefore, based on that information in the memory about that feature point 60, the actual (x,y) location of $\overline{P}_1$ is known. However, CPU 74 computes the point 85 at which the ray 86 from $\overline{P}_1$ passes through the virtual screen 92 based on a guess or estimated location (x,y,$\phi,\theta,\psi$) for the optical center 66, which is also designated $\overline{P}_0$ in FIG. 4. With such known location (x,y) of $\overline{P}_1$ and such guessed or estimated location (x,y,$\phi,\theta,\psi$) of $\overline{P}_0$, the forward distance 94 can be found by: Forward Depth=($\overline{P}_1-\overline{P}_0$)•$\bar{f}$, where • means dot product and $\bar{f}$ is the forward vector, which aligns with the optical axis 68. Further, the perpendicular distance 96 can be found by: Perpendicular Distance=($\overline{P}_1-\overline{P}_0$)•$\bar{r}$, where • means dot product and $\bar{r}$ is vector 185, which is perpendicular to the forward vector $\bar{f}$. The distance s' for the predicted point 85 at which the ray 86 from $\overline{P}_1$ passes through the virtual screen 92 based on the actual $\overline{P}_1$ location and on that guess or estimation of the $\overline{P}_0$ location can be found by: s'=d*(Perpendicular Distance)/(Forward Depth), where d is the specific distance between the optical center 66 and the virtual screen 92 where the intersections 85, 87, 89 of the rays 84, 86, 88 are scaled to be units of the image sensor 64 pixels with the proper predetermined selection of the virtual screen distance d. The virtual screen distance d is a parameter specific to a given design, is calculated once at the factory, and is subsequently assumed to be identical for every unit manufactured with that design. In the example just described based on the example position and orientation of the positioning device 12 illustrated in FIG. 4, the Perpendicular Distance would be a negative (−) number, and a point that lies along the direction of the forward vector 68 would have a perpendicular distance of zero (0). Similar calculations can be made for the other feature points 60 identified in the portion of the coded strip 16 that is imaged, e.g., $\overline{P}_2$ and $\overline{P}_3$ in FIG. 4. As mentioned briefly above, the actual distances s for the intersection points 85, 87, 89 are measured, and an error metric E that is indicative of the differences between the predicted s' values and the measured s values is computed at step 136 in FIG. 5, and the process is repeated, each time with a new proposed position, until the error metric E becomes small enough at step 138 in FIG. 5 that the estimated location and angular orientation $(x,y,\phi,\theta,\psi)$ of the optical center 66 that results in such predicted s' values are considered to be a sufficiently precise establishment of the actual location of the optical center 66 in the performance arena 10, i.e., considered to be stable. As mentioned above, the initial guess for the location of the optical center 66 in the performance arena 10 can be arbitrary or it can be based on some estimation. One example estimation for an initial location can be made by the CPU 74 selecting the feature point 60 in the image 104 that has the most negative s, the feature point 60 in the image 104 that has the most positive s, and a feature point 60 in the image 104 nearest the middle, i.e., the smallest absolute value of s. With those measured s values, the CPU can calculate an initial estimate for a location (x,y,) for the optical center 66 using an analytic expression, and it can calculate an initial orientation $(\phi,\theta,\psi)$ estimate using the s distance nearest to the middle. Both the aforementioned position estimation and the aforementioned angle estimation computations are based on analytical solutions that can be obtained by persons skilled in the art.

Figure 12:
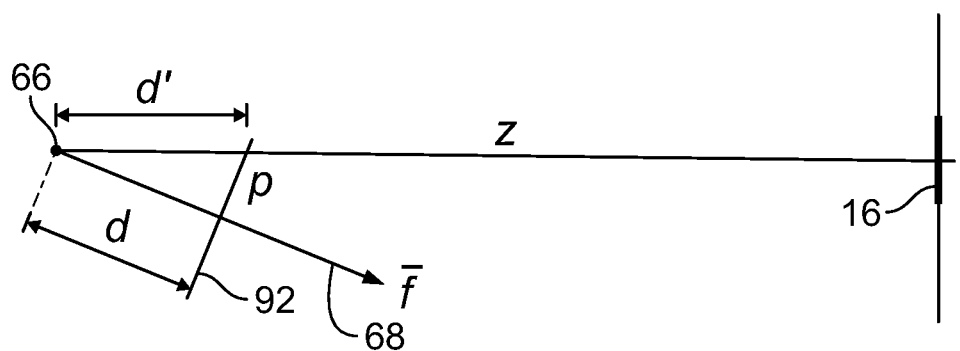
FIG. 12 is a side view representation of the parameters in FIG. 4 when the camera of the positioning device is tilted downward with the coded strip still appearing at the top of the field of view.
Figure 13:
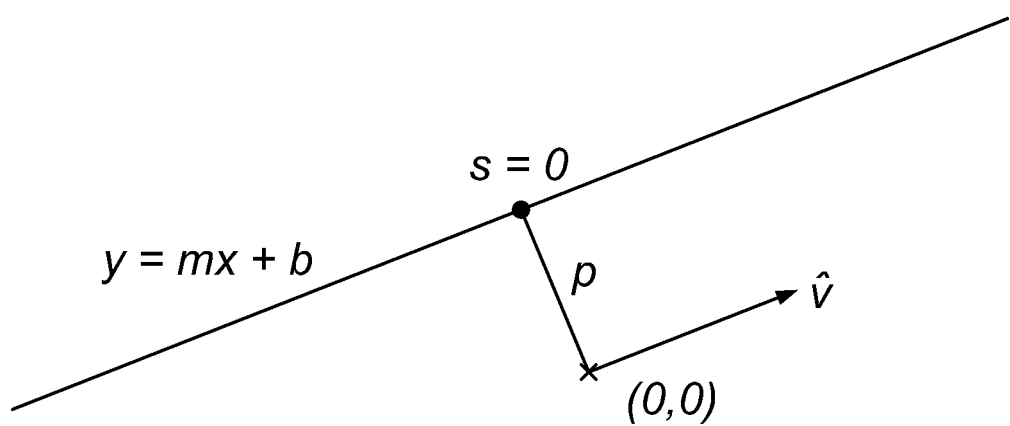
FIG. 13 is a conceptual representation of camera tilt and twist showing parameters that relate to compensation and accurate position retrieval.
Figure 14:
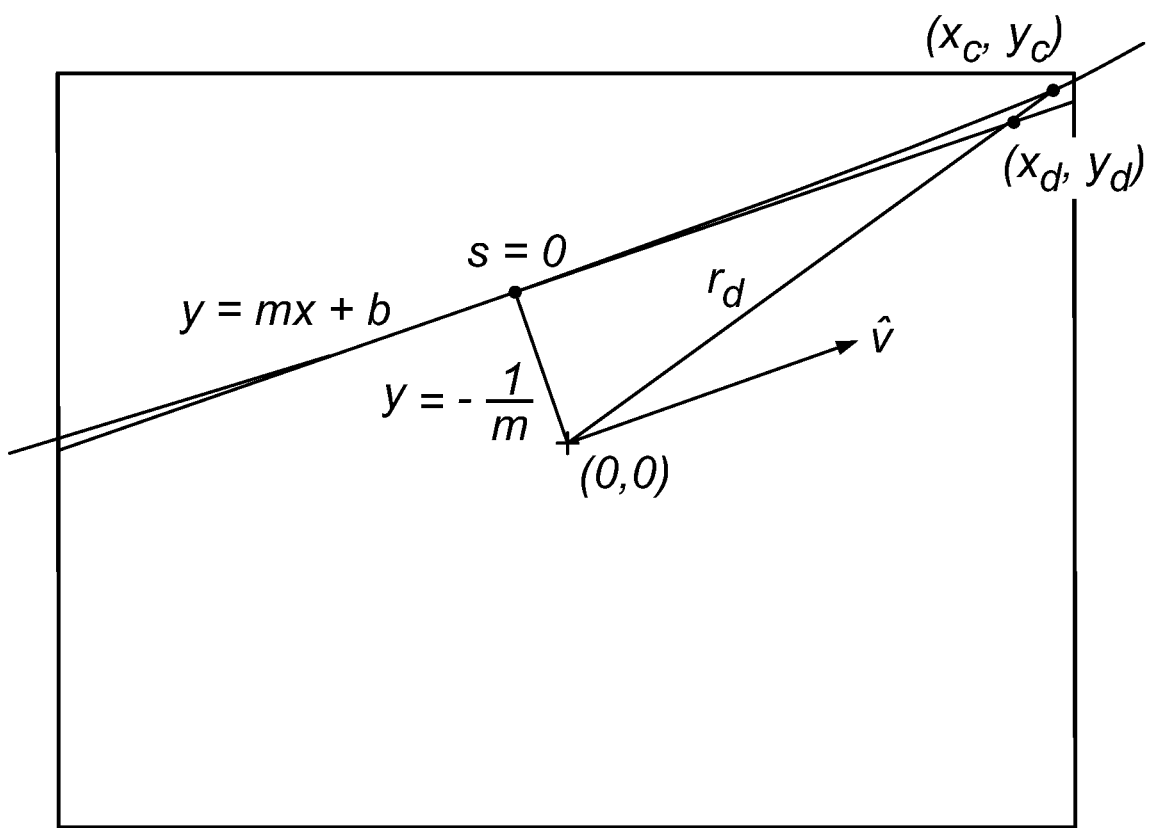
FIG. 14 is a diagram that illustrates lens distortion and a radial representation used to correct such distortion.

At the same time, the code signal 123 extracted at step 118 in FIG. 5 is corrected for any pitch, tilt, or lens distortion at step 140. Further, a zero crossing feature detect step 142 determines zero crossings of the detected signal 123. The zero crossings of the detected signal 123 correspond to feature points 60 of the coded strip 16, for which precise locations in three dimensions (x,y,z) are known and defined in advance by the design and construction of the coded strip 16 and its mounting on the performance arena 10 as explained above. FIG. 12 illustrates an example of the parameters in FIG. 4 when the camera in the positioning device 12 is tilted downward with the coded strip 16 still appearing at the top of the field of view and a roll angle $(\phi)$ of zero degrees for simplicity of explanation. FIG. 13 is a conceptual representation of camera pitch and roll showing parameters that relate to compensation and accurate position retrieval. FIG. 14 illustrates lens distortion and a radial representation used to correct such distortion. The example process for establishing precise locations of the optical center 66 of the lens system 62 of the positioning device 12 in the performance arena 10 relies as described above on the precise measurement of these feature points 60 in the captured image. In this example process, a sub-pixel measurement of the mapping of the feature points 60 is used to improve accuracy. As such, when a change in sign is detected between adjacent elements $y_{i-1}$ and $y_i$ of detected signal 123, a sub-pixel estimation is made using linear interpolation as $$s = i - 1 + \frac{y_{i-1}}{y_{i-1} - y_i} \quad (1)$$

where s is a floating point interpolation of the integer index I of the detection array 122 describing a sub-pixel estimate of the zero crossing.

A momentary or continuous pitch of the camera in the positioning device 12 up or down causes a change in the apparent visual screen distance d (see FIG. 4), as d', resulting in a scaling of the distance parameter s that is corrected by a factor k using $$k = \frac{d}{d'} = \frac{d}{\sqrt{d^2 + p^2}} \quad (2)$$

In addition to being oriented with a non-zero pitch, the camera may be oriented to, or experience, non-zero roll. Such a roll has the effect of rotating the best fit line 116 in the associated image 104 (FIG. 6). Such a roll also has the effect of moving the apparent location of the point associated with the parameter s=0 along the best fit line 116. The tilt offset p of FIG. 13 is found as $$p = \frac{b}{\sqrt{1 + m^2}} \quad (3)$$

With these two corrections, the zero crossings of the detected signal 123 are mapped to the parameter s as $$s_i = \frac{d(x_i(1 + m^2) + bm)}{\sqrt{d^2(1 + m^2) + b^2}} \quad (4)$$

where x is the floating point zero crossing pixel coordinate defined as per the coordinate system of FIG. 14.

A further improvement in accuracy can be included by using lens correction approximated by $$\beta = 1 + k_1 r_d^2 + k_2 r_d^4 + k_3 r_d^6 \quad (5)$$

where $$r_d = \sqrt{x_d^2 + y_d^2} \quad (6)$$

as defined in FIG. 14. Accordingly, the zero crossings of the feature points 60 are detected at step 142 (zero crossing feature detect) in FIG. 5 as $$s_i = \frac{\beta d(x_d^i + m y_d^i)}{\sqrt{(d^2(1 + m^2) + \beta^2 b^2)}} \quad (7)$$

Then, a mapping of the parameter s' is computed in the step transform to line coordinates 134 in FIG. 5 as $$s_i' = d \frac{\cos(\theta)(x_i - x) - \sin(\theta)(y_i - y)}{\sin(\theta)(x_i - x) + \cos(\theta)(y_i - y)} = d \frac{(\mathcal{P}_i - \mathcal{P}_0) \cdot \overline{r}}{(\mathcal{P}_i - \mathcal{P}_0) \cdot \overline{f}} \quad (8)$$

In these equations, $\overline{f}=(\sin(\phi), \cos(\phi))$ and $\overline{r}=(\cos(\phi), -\cos(\phi))$.

Because the precise locations of the code feature points 60 are known as explained above, and because those feature points 60 have a one-to-one correspondence with the zero crossings of the detected signal 123, and because the ideal mapping of those feature points 60 into the virtual screen 92 coordinates is known, then the error E in the step compute error 136 in FIG. 5 proceeds as $$E = \frac{1}{2}\sum_n (s_i - s'_i)^2 \qquad (9)$$

The computed error E in step 136 in FIG. 5 is monitored in step 138 (stable) to determine if the error E has stopped decreasing, which indicates that the best position has been found. If the error E is determined at step 138 to be not yet optimally reduced, then the process loops to the step propose new position 144 in FIG. 5, where a new trial position can be computed based, for example, on Newton-Raphson or bisection methods. Using the Newton-Raphson method, which is known to persons skilled in the art, the residual $r_1$ is first defined as $$r_i = s_i - s'_i \qquad (10)$$

and Ci is defined as $$C_i = \frac{d}{((P_i - P_0) \cdot \bar{f})^2} \qquad (11)$$

The Jacobian can be computed as $$J_x = \frac{\partial r_i}{\partial x} = (y_i - y)C_i \qquad (12)$$

$$J_y = \frac{\partial r_i}{\partial y} = (x_i - x)C_i$$

$$J_\theta = \frac{\partial r_i}{\partial \theta} = ((x_i - x)^2 + (y_i - y)^2)C_{ji}$$

so that the gradient of the error function in closed form is $$\nabla_x f(p) = \sum_m (y_i - y)C_i r_i \qquad (13)$$

$$\nabla_y f(p) = \sum_m (x_i - x)C_i r_i$$

$$\nabla_\theta f(p) = \sum_m ((x_i - x)^2 + (y_i - y)^2)C_i r_i$$

The Newton step is then $$\bar{p}_{j+1} = \bar{p}_j - \alpha(\nabla^2 f(\bar{p}_j))^{-1} \nabla f(\bar{p}_j) \qquad (14)$$

Where the Hessian is approximated as $$\nabla^2 f(x) \approx J(x)^T J(x) \qquad (15)$$

Thus, the new proposed position $\bar{p}_{j+1}$ is proposed in the step propose new position 144 in FIG. 5, and that proposal is used as the new position trial in the step transform to line coordinates 134 in FIG. 5. The iteration is continued until the error E becomes stable at the step stable 138 in FIG. 5, whereupon the location and orientation of the optical center 66 in the performance arena 10 is considered to be the last proposed position $\bar{P}_0 = (x,y,z,\phi,\theta,\psi)$ from the step propose new position 144 as illustrated in FIG. 5. As explained above, the vertical (z) value can be ignored because the optical center 66 is always in the plane 76 at height h (FIG. 1), and the yaw ($\phi$) is in the equations, e.g., equation (8) above, as $\bar{f} = (\sin(\phi), \cos(\phi))$ and $\bar{r} = (\cos(\phi), -\cos(\phi))$. The pitch ($\theta$) and the roll ($\psi$) are determined after the iteration loop is completed as $$\theta = \operatorname{atan}\left(\frac{b}{d\sqrt{1+m^2}}\right)$$

and $$\psi = \operatorname{atan}(m)$$

These computations are low compared to the power of even inexpensive, off-the-shelf processors available commercially, such that update rates of greater than ten (10) updates per second are achieved easily.

In summary, a given image 104 as sampled by the image sensor 64 corresponds to one and only one particular position and orientation of the optical center 66. Therefore, every distinct position and orientation of the optical center 66 corresponds to a unique and predictable location of feature points 60 in a virtual image 92. It is essentially a guessing process to find the position and orientation of the optical center 66 by guessing and then comparing a predicted image with the actually measured image. Accordingly, the CPU 74 guesses a plurality of positions for the optical center 66 until it can internally reconstruct the same picture as the image sensor 64 sees.

In practice, the process does not perform computations to match images, but instead converts the information of the images to one-dimensional arrays. This process is accomplished by converting the image 104 captured by the image sensor 64 into a one-dimensional set of feature points 60 identified by their 1-dimensional distance along the center line 52 of the coded strip 16. The CPU 74 also identifies the identity of each feature point 60 so that the coordinates (x,y) of each feature point 60 is known. Theses identifications enable the metric error E used for the guessing process to compare measured 1-dimensional lists instead of having to compare the measured image 104 against an internally generated virtual image, which would be much more computationally expensive. Given a virtual trial position and orientation of the optical center 66, it is straight forward to determine which optical features 60 would be visible and exactly where they will land in the image, and therefore generate a 1-dimensional list of the virtual positions s of the feature points 60 along a virtual center line. With the measured image 104 from the image sensor 64 converted to a 1-dimensional list of distances s, and given that a virtual 1-dimensional list of distances s' can be predicted from any trial position of the optical center 66, then the process can loop by trying a plurality of positions and orientations until the internally generated 1-dimensional list of the feature point 60 positions s' matches the 1-dimensional distances s as measured from the image sensor 64. Finally, the loop converges to the position that minimizes the square of the difference between the 1-dimensional lists s'−s.

Figure 15:
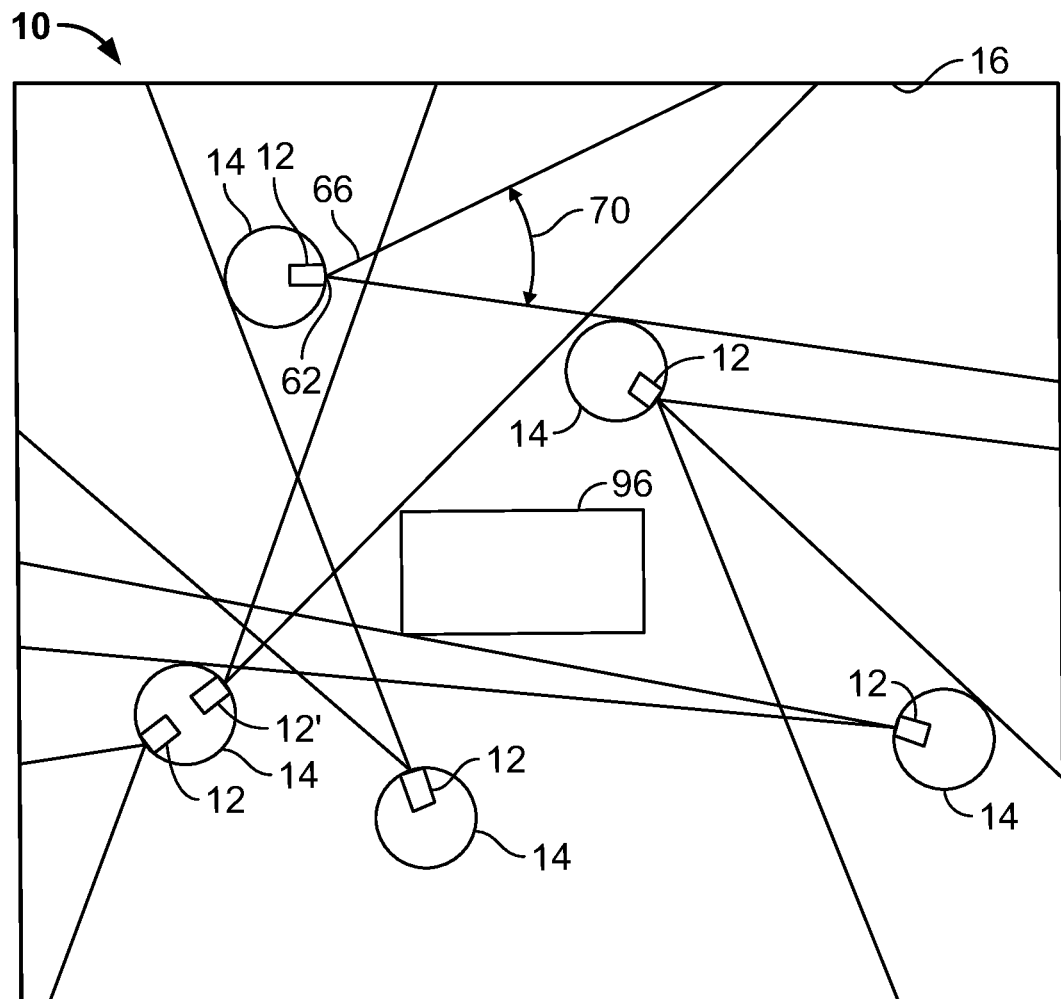
FIG. 15 is a diagrammatic plan view of the example robot performance arena in FIG. 1 with multiple robots equipped with positioning devices and an example stationary object in the performance arena

As illustrated in FIG. 15, multiple positioning devices 12, for example, mounted on multiple robots 14, that move independently of each other can operate simultaneously in the same performance arena 10 as illustrated, for example, in FIG. 15. Each of the positioning devices 12 can establish precise locations of its optical center 66 in real-time as described above and produce position signals for such locations for use by the robot 14 on which such positioning device 12 is mounted. Depending on the angle of view 70 of the lens system 62, each camera of each positioning device 12 can usually see a portion of the coded strip 16 in its field of view with enough feature points 60 (FIG. 4) to establish a location for its optical center 66, even with other mobile robots 14 or random objects 96 occluding portions of the coded strip 16 from the camera. In one example, addition of one or more additional positioning devices 12' are mounted on a robot 14 and pointed in a different direction, e.g., 180 degrees, from the first positioning device 12 can further reduce the probability of complete occlusion of the code strip 16 for such particular robot 14. Also, an expansion of the field of view 70 can reduce the probability of complete occlusion of the coded strip from the field of view 70. However, as mentioned above, such expansion of the field of view 70 may reduce the number of signal 123 samples per interval 58 to an unacceptable value in cases where the positioning device 12 is far away from the coded strip 16.

The positioning device 12 can also be used for additional image analysis, such as object 14, 96 avoidance, object 14, 96 location, etc. Inherent in the hardware needed to process images 104 from the image sensor 64 and establish a location, as described above, is the ability to perform further image analysis. For example, the image 104 from the image sensor 64 can first be processed for the location of the optical center 66 as described above, and then the image 104 can be further processed to determine the presence of other objects 14, 96 to determine the presence of such other objects or obstructions.

Accordingly, resort may be made to all suitable combinations, subcombinations, modifications, and equivalents that fall within the scope of the invention as defined by the features. The words "comprise," "comprises," "comprising," "include," "including," and "includes" when used in this specification, including the features, are intended to specify the presence of stated features, integers, components, or steps, but they do not preclude the presence or addition of one or more other features, integers, components, steps, or groups thereof. Also, directional terms, such as "upwardly," "downwardly," "on," "off," "over," "under," "above," "below," etc., may and sometimes do relate to orientation of components and features as illustrated in the drawing sheets, and are not used to require any particular physical orientation or any limitation on orientation of the device or component in actual use unless otherwise indicated in the description.

We claim:

1. A method of assembling a performance arena, comprising placing a coded strip at least partially around or in the performance arena, wherein the coded strip has a beginning end and a terminal end with the a code length between the beginning end and the terminal end, and the placing of the coded strip at least partially around or in the performance arena places the beginning end at a starting position in relation to the performance arena that has a particular location in relation to the performance arena, and wherein the coded strip comprises a plurality of feature points in the code length between the beginning end and the terminal end with each feature point being at a predetermined distance from the beginning end so that each of the feature points in the code length is at the respective predetermined position in relation to the starting position and including applying various segments of the coded strip to a plurality of walls with a center line of the coded strip in each segment positioned at a constant height on each wall.

2. A method of assembling a performance arena, comprising placing a coded strip at least partially around or in the performance arena, wherein the coded strip has a beginning end and a terminal end with the a code length between the beginning end and the terminal end, and the placing of the coded strip at least partially around or in the performance arena places the beginning end at a starting position in relation to the performance arena that has a particular location in relation to the performance arena, and wherein the coded strip comprises a plurality of feature points in the code length between the beginning end and the terminal end with each feature point being at a predetermined distance from the beginning end so that each of the feature points in the code length is at the respective predetermined position in relation to the starting position, and including assembling the plurality of walls around or adjacent a performance space to intersect each other at a plurality of corners, designating one of the corners as the starting position, and mounting the coded strip on the walls with the beginning end of the coded strip positioned at the corner that is designated as the starting position, whereby each of the feature points in the coded strip is located at the respective predetermined distance from the corner that is designated as the starting position.

3. The method of claim 2, including assembling the plurality of walls around or adjacent to a performance surface in such a manner that the center line of the coded strip defines a plane at the constant height above the performance surface.

4. A method for determining position and orientation of a device being positioned within a surrounding structure, the device having a movement control system configured to move the device within the surrounding structure, the method comprising:
    placing a predetermined continuous pattern (code strip) on the surrounding structure, wherein the predetermined continuous pattern is printed with a predetermined, non-repeating sequence of black blocks and white blocks occurring at regularly spaced intervals, and wherein some of the blocks are twice as long as others as measured lengthwise;
    using a positioning system on the device which continuously captures images of the continuous pattern;
    determining a three-dimensional position and three degrees of orientation within the surrounding structure based on the captured images; and
    utilizing the movement control system to move the device within the surrounding structure based on the determined three-dimensional position and three degrees of orientation, and
    wherein the positioning system being capable of capturing images in a field of view configured to determine two-dimensional position and three degrees of orientation with respect to the continuous pattern.

5. The method of claim 4, wherein the positioning system comprises camera with lens system having an effective optical center projecting onto image sensor which is in communication with computational means, which is configured to determine the device's position and orientation independently of any communication outside of itself.

6. The method of claim 5, wherein the surrounding structure is a polygonal shaped structure with the origin of a coordinate system located at a center of the structure and defining a position x-axis to the right of center, and a positive y-axis in front of center.

7. The method of claim 5, wherein the code strip is aligned with corners of the surrounding structure and does not include measurements of the exact location of discrete markers, the continuous code strip automatically self-locates over different feature points without any measurement eliminating calibration and measurement data for the surrounding structure.

8. A performance arena system for vehicles that perform in a performance space, the performance arena system comprising:
a coded strip that has a beginning end and extends a predetermined length to a terminal end and has a predetermined number of predetermined interval distances extending from the beginning end to the terminal end with a sequence of code marks positioned in the interval distances such that respective positions of the code marks are at respective predetermined distances from the beginning end, wherein the coded strip is mountable with the beginning end of the interval distances at a starting position adjacent to a lateral side of a performance space and extendable from the starting position for the predetermined number of interval distances along at least a portion of the lateral side at a height above a perimeter of a performance surface, whereby an image of at least a portion of the coded strip is acquirable by a camera mounted on a vehicle performing in the performance space on the performance surface with an optical axis of the camera pointing toward the lateral side of the performance space and positions of the code marks in such image are relatable to the starting position by the predetermined interval distances.

9. The performance arena system of claim 8, wherein the interval distances of the coded strip are all uniform from the beginning end to the terminal end and the sequence of code marks in the coded strip are positioned at regularly spaced intervals along a code center line that extends from the beginning end to the terminal end.

10. The performance arena system of claim 9, wherein the sequence of code marks comprises a non-repeating sequence of blocks that includes dark blocks interspersed with light blocks.

11. The performance arena system of claim 10, wherein some of the dark and light blocks are positioned above the code center line, and wherein some others of the dark and light blocks are positioned below the code center line.

12. A performance arena system for vehicles that perform in a performance space, the performance arena system comprising:
a coded strip that has a beginning end and extends a predetermined length to a terminal end and has a predetermined number of interval distances extending from the beginning end to the terminal end, wherein the coded strip includes a sequence of code marks comprising dark blocks interspersed with light blocks along a code centerline, some of the dark blocks and light blocks being positioned in some of the interval distances above the code center line and some others of the dark blocks and light blocks being positioned in some of the interval distances below the code center line in such a manner that each interval distance that has a dark block above the code center line also has a light block below the code center line and each interval distance that has a light block above the code center line also has a dark block below the code center line such that transitions of light blocks to dark blocks above the code center align with transitions of dark blocks to light blocks below the code center line and such that transitions of dark blocks to light blocks above the code center line align with transitions of light blocks to dark blocks below the code center line, wherein intersecting corners of dark blocks above the code center line with corners of dark blocks below the code center line form feature points on the code center line.

13. The performance arena system of claim 12, including a positioning device positioned in the performance space that includes a digital camera for acquiring an image comprising one or more portions of the sequence of code marks, the digital camera having a lens system for focusing the image on an image sensor, the lens system having an optical center.

14. The performance arena system of claim 13, wherein the coded strip comprises a code center line and is mountable adjacent to the performance space in a manner that defines a reference plane above a performance surface, and wherein the positioning device is mountable on a vehicle in a manner that positions the optical center in the reference plane.

15. The performance arena system of claim 14, including a processor programmed to compare the image acquired by the digital camera to the sequence of code marks in a memory to identify the one or more portions of the sequence of code marks in the image and to generate signals that are indicative of the position and the orientation of the positioning device in the performance space.

16. A performance arena system, comprising:
a coded strip which extends around at least a portion of one or more lateral sides of an arena space above a performance surface, said coded strip comprising a sequence of code marks beginning at a starting position, wherein portions of the sequence of code marks at any specific position adjacent to the arena space in relation to the starting position are unique to such specific position;
a positioning device positioned in the arena space that includes a digital camera with an optical axis extending laterally in the arena space for acquiring an image comprising one or more of the portions of the sequence of marks; and
a processor programmed to generate signals that are indicative of the position and the orientation of the positioning device in the arena space based on the portion or portions of the sequence of marks in the image.

17. The performance arena system of claim 16, wherein the sequence of code marks includes a non-repeating sequence of blocks at intervals along a code center line.

18. The performance arena system of claim 17, wherein the non-repeating sequence of blocks includes dark blocks interspersed with light blocks.

19. The performance arena system of claim 18, wherein some of the dark and light blocks are positioned above the code center line, and wherein some others of the dark and light blocks are positioned below the code center line.

20. The performance arena system of claim 19, wherein some of the intervals have a dark block above the code center line and a light block below the code center line and others of the intervals have a light block above the code center line and a dark block below the code center line such that transitions of light blocks to dark blocks above the code center align with transitions of dark blocks to light blocks below the code center line, and such that transitions of dark blocks to light blocks above the code center line align with transitions of light blocks to dark blocks below the code center line, wherein intersecting corners of dark blocks above the code center line with corners of dark blocks below the code center line form feature points on the code center line.

21. The performance arena system of claim 20, wherein the digital camera includes a lens system for focusing the image on an image sensor, the lens system having an optical center aligned with the image sensor on the optical axis.

22. The performance arena system of claim 21, wherein the coded strip is mountable adjacent to the arena space in a manner that the code center line defines a reference plane above the performance surface, and wherein the positioning device is mountable on a vehicle in a manner that positions the optical center in the reference plane.

* * * * *